UNITED STATES PATENT OFFICE.

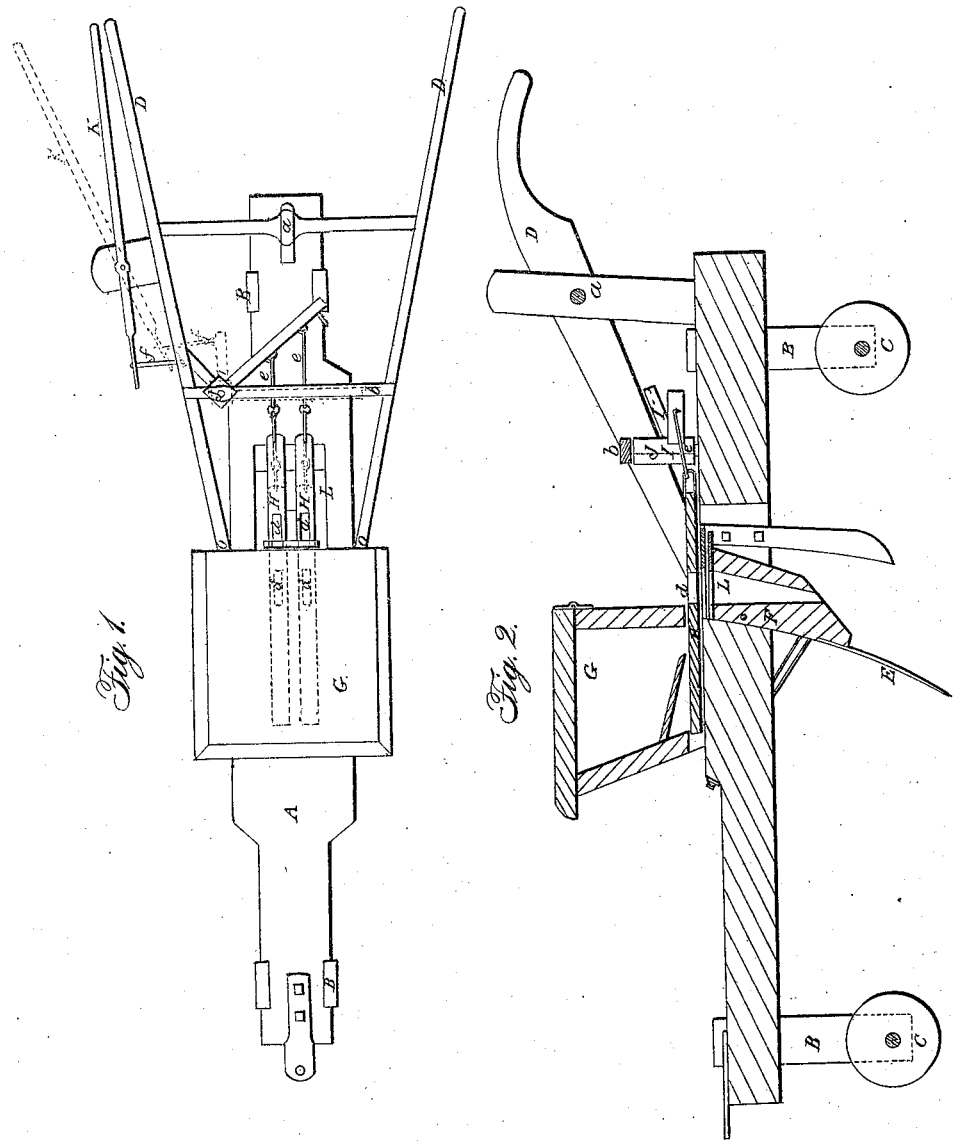

JOSEPH McKOWN, OF GERRARDSTOWN, VIRGINIA.

IMPROVEMENT IN SEED-PLANTERS.

Specification forming part of Letters Patent No. 24,135, dated May 24, 1859.

*To all whom it may concern:*

Be it known that I, JOSEPH McKOWN, of Gerrardstown, in the county of Berkeley and State of Virginia, have invented a new and useful Improvement in Seed-Planters; and I do hereby declare that the following is a full, clear, and exact description of the same, reference being had to the accompanying drawings, forming a part of this specification, in which—

Figure 1 is a plan or top view of a seed-planter with my improvement applied to it. Fig. 2 is a vertical longitudinal section of the same.

Similar letters of reference in each of the several figures indicate corresponding parts.

The nature of my invention consists in the arrangement for united operation of the horizontally-moving hand-lever, vertical shaft, horizontal elbow-lever, horizontal slides, divided hopper, vacuum-plate, and seed-tube, whereby an exceedingly simple and effective plow-handle, combined seed-planter, and guano-dropper is produced, said planter being perfectly under the control of the operator and capable of being conveniently operated from the rear of the handles, and after the seed is dropped covering in the same by a share and rollers.

To enable others skilled in the art to make and use my invention, I will proceed to describe its construction and operation.

A represents the beam, mounted on a front and rear standard, B B, said standards having each a roller, C, the front roller steadying the machine and the rear one performing a like function and the additional one of rolling in the seed.

D D are plow-handles of the beam. These handles are braced and supported as at *a b c*.

E is the cultivator or spade attached to the lower end of a hollow seed-tube, F, leading down from the upper side of the beam.

G is the seed and guano hopper. It is formed with a partition, and each chamber has a passage at its rear. This hopper is placed forward of the seed-tube, and the seed and guano have to be carried out of the back of the hopper to the tube.

H H are slides for taking the seed and guano from the hopper. These slides fit on the upper side of the beam, and have openings *d d* through them, so as to take the seed from the hopper and drop it into the tube. These slides are connected to a horizontal elbow-lever, I, by means of links *e e*, said elbow-lever having the reciprocating vertical shaft J as its fulcrum, and said shaft being connected to a hand-lever, K, by means of a link, *f*. The hand-lever K is pivoted to a bracket of one of the handles, so as to be moved by hand back and forth laterally, and thus caused to move the slides in and out of the hopper in a manner to take seed and guano therefrom and deposit the same into the tube F.

L is a vacuum-plate for forming a space or vacuum between the side plate, *z*, and thus guarding the same from thrust when the share E meets with obstructions. Were it not for this plate, the thrusting action of the share would come directly upon the plate *z* and cause the same to loosen and rise and interfere with the action of the slide.

What I claim as my invention, and desire to secure by Letters Patent, is—

The arrangement for united operation of the horizontally-moving hand-lever K, vertical shaft J, horizontal elbow-lever I, horizontal slides H H, divided hopper G, seed-tube F, and vacuum-plate L, substantially as and for the purposes set forth.

JOSEPH McKOWN.

Witnesses:
  G. W. HOKE,
  SAMUEL KENNEY.